US 9,222,689 B2

United States Patent
Fakieh

(10) Patent No.: US 9,222,689 B2
(45) Date of Patent: Dec. 29, 2015

(54) COMBINED AIR CONDITIONING AND WATER GENERATING SYSTEM

(76) Inventor: Abdulrahman Abdulkader Mohammed Fakieh, Makkah (SA)

( * ) Notice: Subject to any disclaimer, the term of this patent is extended or adjusted under 35 U.S.C. 154(b) by 902 days.

(21) Appl. No.: 13/429,887

(22) Filed: Mar. 26, 2012

(65) Prior Publication Data
US 2012/0247135 A1   Oct. 4, 2012

(30) Foreign Application Priority Data
Mar. 28, 2011   (CA) ..................................... 2736085

(51) Int. Cl.
| F25D 17/06 | (2006.01) |
| F25D 21/14 | (2006.01) |
| F24F 5/00 | (2006.01) |
| E03B 3/28 | (2006.01) |
| F24F 3/14 | (2006.01) |

(52) U.S. Cl.
CPC . *F24F 5/001* (2013.01); *E03B 3/28* (2013.01); *F24F 3/1405* (2013.01); *F24F 2003/144* (2013.01); *F24F 2003/1446* (2013.01)

(58) Field of Classification Search
CPC ..... F24F 3/14; F24F 3/1405; F24F 2003/144; F24F 2003/1446; F24F 2003/1452; E03B 3/28
USPC ..................... 236/44 C; 62/93, 285, 291, 408
See application file for complete search history.

(56) References Cited

U.S. PATENT DOCUMENTS

| 6,481,232 B2 | 11/2002 | Faqih |
| 6,755,037 B2 | 6/2004 | Engel et al. |
| 6,796,135 B1 * | 9/2004 | Bhatti et al. ..................... 62/150 |
| 2008/0276630 A1 * | 11/2008 | Lukitobudi ....................... 62/93 |

* cited by examiner

*Primary Examiner* — Mohammad M Ali
*Assistant Examiner* — Daniel C Comings
(74) *Attorney, Agent, or Firm* — Miller Law Group, PLLC

(57) ABSTRACT

An Air conditioning and potable water generating system in which a cooling element condenses water from atmospheric air is operable two switch between an air conditioning mode, in which cooled atmospheric air from which water has been extracted is supplied to a building's interior environment, and a water generating mode, in which communication of such supply air into the building interior is closed off. The system can thus be operated to collect water regardless of whether cooling of the building interior is required at a particular point in time. Use of the same cooling element in each mode provides and use of return air from the building to mix with incoming fresh air and cool the heat dissipating element of the cooling system make for efficient operation. Controls of the system are operable to change a mixture ratio of the fresh atmospheric air and circulating return air.

18 Claims, 2 Drawing Sheets

Elevation of the unit (F3) and the building (*Not to Scale*).

Elevation of the unit (F3) and the building (*Not to Scale*).

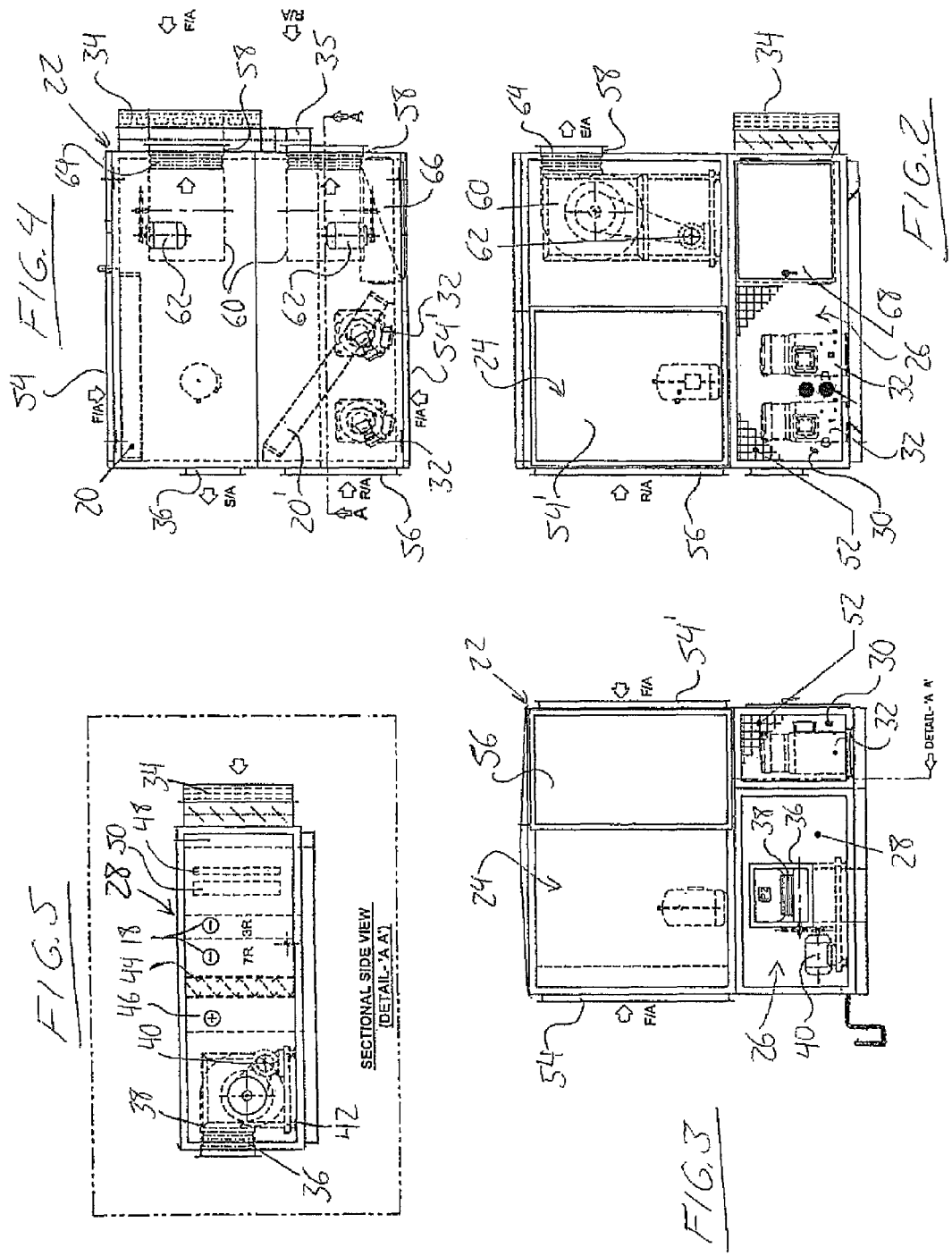

COMBINED AIR CONDITIONING AND WATER GENERATING SYSTEM

CROSS REFERENCE TO RELATED APPLICATIONS

This application claims benefit under 35 U.S.C. 119(a) of Canadian Patent Application Serial No. 2,736,085, filed Mar. 28, 2011, the entirety of which is incorporated herein by reference.

FIELD OF THE INVENTION

The present invention relates generally to a system for cooling and ventilating an indoor environment and generating potable water by cooling outdoor air drawn into the system and extracting moisture from the outdoor air.

BACKGROUND OF THE INVENTION

Extreme heat in tropical and semi-tropical regions is usually accompanied by extremes of high humidity, especially at low altitude where bayous, marshlands, swamps, shallow lakes, heavy vegetations, and forests are abundant; tropical islands, such as the islands of the Caribbean Sea; arid land and deserts nearby oceans shorelines or seashores; such as the regions East of the red Sea and West of the Gulf on the Arabian Peninsula. Generally, natural freshwater resources are scarce or limited in very hot and humid arid areas by or near shorelines due to low precipitation and rainfall and high salinity of underground water.

Shortage in supply of potable water and freshwater is increasing at a vast rate as deserts expand and overtake fertile land and as many of the natural ground water resources are being depleted. Shift in global weather patterns throughout time resulted in a drop in the rate of rainfall in many populated areas. In addition, large cities are expanding at a fast pace, swallowing neighboring villages and small towns, leading to drastic change in the lifestyle of inhabitants of regions of extreme high temperatures and humidity. With the shift from rural to urban lifestyle, people are forced to live in crowded housing and congested apartments with no or little opportunities to fresh air, thus suffering from stuffiness, heat and humidity, and being more exposed to an increasing shortage of freshwater supply.

Accordingly, there is a great need in most new residential developments in hot humid regions for easy access to sufficient freshwater supply as well as for means to cool and dry indoor atmosphere to a level that is barely adequate for leading a healthy and relatively comfortable existence in the dwellings of people with limited resources. Luckily, the lifestyle of people in most of the hot humid regions is such that residents do not require great reduction in temperature or humidity to lead a comfortable life in their housing or work environment.

Water condensation from humid hot air takes place as part of any air conditioning or air drying cycle employed in the wide spread commercial devices used in apartment buildings, residential homes, industrial facilities and commercial establishments. Usually the condensate from such devices drips out and is customarily disposed of as useless wastewater. Naturally, collection and treatment of the drained condensate can provide a continuous source of freshwater.

The prior art includes different configurations of air conditioning devices and systems which collect the water condensed from the air as it is cooled by the air conditioner.

Some such systems are disclosed in Applicant's U.S. Pat. No. 6,481,232, and include window mounted, wall mounted, and centralized embodiments for air conditioning and production of freshwater and drinking water by condensation of water vapor from the air being cooled. Most of the embodiments of this prior patent collect water from circulating indoor air when operated in a cooling mode circulating indoor air and/or water from outdoor air entering the indoor environment when operated in a ventilation mode. One central air conditioning embodiment employs two refrigerant loops, one for cooling and dehumidifying outdoor air and another for cooling and dehumidifying air that has been circulated through the indoor space, thus increasing water producing capacity by processing hot, humid outdoor air, but at the cost of increased system size and duplicated equipment.

U.S. Pat. No. 6,755,037 teaches potable water extraction systems, including embodiments intended for incorporation into an existing central air conditioning system. One such embodiment adds an additional refrigerant evaporator to the air conditioner's refrigeration circuit and positions this over a water collection tray in a separate duct fed by the existing ductwork. Valves are used in the refrigeration circuit to give user-selection over which of the two refrigerant evaporators is in use, either the original air conditioning evaporator for cooling the house, the newly added evaporator for generating and collecting water. This embodiment is thus operable to perform only one of indoor cooling or water production at any given time. Another embodiment avoids the need for an extra evaporator by instead only adding a water collection arrangement beneath the air conditioning's existing evaporator, but therefore is only operable to produce and collect water when the indoor environment is being cooled.

Applicant has developed a unique system which is operable to condense water from outdoor atmospheric air in both a cooling mode and a water-producing mode in an energy and equipment efficient manner.

SUMMARY OF THE INVENTION

According to a first aspect of the invention there is provided an conditioning and water generating system comprising: a cooling chamber having a cooling chamber inlet and a cooling chamber outlet;

a cooling element disposed within the cooling chamber between the cooling chamber inlet and cooling chamber outlet;

a supply air passage connecting the cooling chamber outlet to an interior environment of a building;

a forced air system operable to draw atmospheric air from an external environment outside the building through the cooling chamber inlet and past the cooling element;

a water collection system configured to collect water that condenses from the atmospheric air during flow thereof past the cooling element under operation of the forced air system;

a control system operable to control air flow through the supply air passage and thereby switch between an air conditioning mode, in which flow through the supply air passage is allowed to supply the interior environment with cooled air from the cooling chamber, and a water generating mode, in which the flow through the supply air passage to the interior environment is closed off, whereby water condensed from the atmospheric air by operation of the cooling element in the cooling chamber is collected by the water collection system in both the air conditioning and water generating modes;

a return air passage connected between the interior environment of the building and the cooling chamber, the forced air system being operable in the air conditioning mode to direct a flow of return air from the interior environment past the cooling element with a flow of fresh atmospheric air entering the cooling chamber inlet from the exterior environment; and a shortcut path openable and closeable between the supply air passage and the return air passage, the control system being configured to open the shortcut path in the water generating mode in order to shortcut the supply air passage to the return air passage in order to recirculate at least some of the cooled air from the cooling chamber back to the cooling chamber for a subsequent pass therethrough without circulation of said cooled air through the interior environment of the building.

Preferably there is provided:

a heat dissipation chamber having a heat dissipation outlet communicating with the external environment;

a heat dissipating element disposed within the heat dissipation chamber and cooperating with the cooling element to discharge heat collected thereby from the atmospheric air in the cooling chamber; and a return air path connected between the interior environment of the building and the heat dissipation chamber;

the forced air system being operable to direct a stream of return air from the interior environment through the return air path, past the heat dissipating element and onward through the heat dissipation outlet to the external environment.

Preferably the return air passage and the return air path branch apart from a common return air feed.

Preferably the return air passage and the return air path are arranged to receive equal airflows from the common return air feed.

Preferably the shortcut path is connected between the supply air passage and the common return air feed in order to shortcut the supply air passage to both the return air passage and the return air path in the water generating mode.

Preferably the heat dissipation chamber has at least one atmospheric air inlet communicating with the external environment, the forced air system being operable to convey the stream of return air past the heat dissipation element with a stream of fresh atmospheric air.

Preferably the heat dissipation chamber and the cooling chamber are each part of a same common structure.

Preferably the cooling element comprises an evaporator of a refrigeration system and the heat dissipating element comprises a condenser of said refrigeration system.

Preferably the control system is operable to change a ratio between fresh atmospheric air and return air in the flow of return air and fresh atmospheric air past the cooling element without switching between the air conditioning and water generating modes.

Preferably the control system is operable to change the ratio on the basis of user input from an operator.

Preferably the control system is configured to allow change of the ratio over a range of values, said range including a ratio value reflective of a respective mixture level somewhere between 40 and 60% fresh atmospheric air.

Preferably the control system is configured to allow change of the ratio over a range of values, said range of values including a 1:1 ratio value reflective of a mixture of 50% fresh atmospheric air and 50% return air.

Preferably the control system is configured to default to said ratio value in at least one of the air conditioning and water generating modes.

Preferably the control system is configured to default to the 1:1 ratio value in at least one of the air conditioning and water generating modes.

Preferably the control system is configured to default to said ratio value in the air conditioning mode.

Preferably the control system is configured to default to said ratio value in the water generating mode.

Preferably the cooling element comprises an evaporator of a refrigeration system.

Preferably there is provided a monitoring system operable to measure water collection by the water collecting system and record data reflective of volumes of water collected during different respective time periods of equal length for use in determining optimal times for operating the system in the different modes.

Preferably the monitoring system is operable to also measure energy consumption and record data reflective of amounts of energy consumed during said different respective time periods of equal length for use in determining optimal times for operating the system in the different modes.

Preferably the monitoring system comprises an output device by which information on the recorded data is displayable for consideration by an operator in selecting when to operate the system in the different modes.

According to a second aspect of the invention there is provide an air conditioning and water generating system comprising:

a cooling chamber having a cooling chamber fresh air inlet for receiving a first stream of atmospheric air from an external environment outside a building, a cooling chamber return air inlet for receiving a first stream of return air from an interior environment of the building, and a cooling chamber supply air outlet for supplying air to the interior environment of the building from the cooling chamber;

a cooling element disposed within the cooling chamber between the cooling chamber inlets and the cooling chamber outlet;

a water collection system configured to collect water that condenses from the air flowing past the cooling element under operation of the forced air system;

a heat dissipation chamber having a second fresh air inlet for receiving a second stream of atmospheric air from the external environment, a second return air inlet for receiving a second stream of return air from the interior environment of the building, and an exhaust outlet communicating with the external environment;

a heat dissipating element disposed within the heat dissipation chamber between the second fresh air inlet and the exhaust outlet and cooperating with the cooling element to discharge heat that is collected from airflow past the cooling element in the cooling chamber; and a forced air system operable to force a first air mixture of the first stream of atmospheric air and first stream of return air through the cooling chamber from the cooling chamber fresh air inlet and cooling chamber return air inlet to the supply air outlet, and force a second air mixture of the second stream of atmospheric air and second stream of return air through the heat dissipating chamber from the second fresh air inlet and second return air inlet to the exhaust outlet.

Preferably there is provided a supply air passage connecting the supply air outlet of the cooling chamber to the interior environment of the building, first and second return air passages connecting the interior environment of the building to the cooling chamber air inlet and the second return air inlets of the cooling and heating chambers respectively, and a control system operable to control air flow through the supply air passage and thereby switch between an air conditioning mode, in which flow through the supply air passage is allowed to supply the interior environment with cooled air from the cooling chamber, and a water generating mode, in which the flow through the supply air passage to the interior environment is closed off, whereby water condensed from the atmospheric air by operation of the cooling element in the cooling chamber is collected by the water collection system in both the air conditioning and water generating modes.

Preferably the control system is arranged to shortcut the supply air passage to the first and second return air passages in the water generating mode to bypass the interior environment of the building.

Preferably the first and second return air passages are arranged to each receive half of an overall return airflow from the interior environment of the building.

Preferably the forced air system is arranged to enable a fresh air content of up to 40-60% in the first air mixture.

Preferably the forced air system is arranged to enable a fresh air content of 50% in the first air mixture.

Preferably the forced air system is arranged to default to a fresh air content of between 40 and 60% in the first air mixture.

Preferably the forced air system is arranged to default to a fresh air content of 50% in the first air mixture.

According to a third aspect of the invention there is provided an air conditioning and water generating system comprising:

a cooling chamber having a cooling chamber inlet and a cooling chamber outlet;

a cooling element disposed within the cooling chamber between the cooling chamber inlet and cooling chamber outlet;

a supply air passage connecting the cooling chamber outlet to an interior environment of a building;

a forced air system operable to draw atmospheric air from an external environment outside the building through the cooling chamber inlet and past the cooling element;

a water collection system configured to collect water that condenses from the atmospheric air during flow thereof past the cooling element under operation of the forced air system;

a return air passage connected between the interior environment of the building and the cooling chamber, the forced air system being operable in the air conditioning mode to direct a flow of return air from the interior environment past the cooling element with a flow of fresh atmospheric air entering the cooling chamber inlet from the exterior environment; and wherein the return passage, forced air system and cooling chamber inlet are arranged to enable mixture of the return air and the fresh atmospheric air in the cooling chamber at a ratio providing 40-60% fresh air content in said mixture.

Preferably there is provided a control system operable to control the ratio of the mixture of the return air and the fresh atmospheric air in the cooling chamber to enable variation of the ratio over a range of values including one or more ratio values each reflecting a level of fresh air content between 40-60%.

Preferably the one or more ratio values include a 1:1 ratio value reflective of a mixture of 50% fresh atmospheric air and 50% return air.

Preferably the control system is arranged to default to one of said ratio values reflecting the level of fresh air content between 40-60%.

Preferably the control system is arranged to default to said 1:1 ratio value.

BRIEF DESCRIPTION OF THE DRAWINGS

In the accompanying drawings, which illustrate a exemplary embodiments of the present invention:

FIG. 2 is a side elevational view of the apparatus schematically shown in FIG. 1.

FIG. 3 is an end view of the apparatus schematically shown in FIG. 1.

FIG. 4 is an overhead plan view of the apparatus schematically shown in FIG. 1.

FIG. 5 is a partial cross-sectional view of the apparatus schematically shown in FIG. 1 as indicated by Detail 'A A' of FIG. 3 and line A-A of FIG. 4.

DETAILED DESCRIPTION

Figure 1:
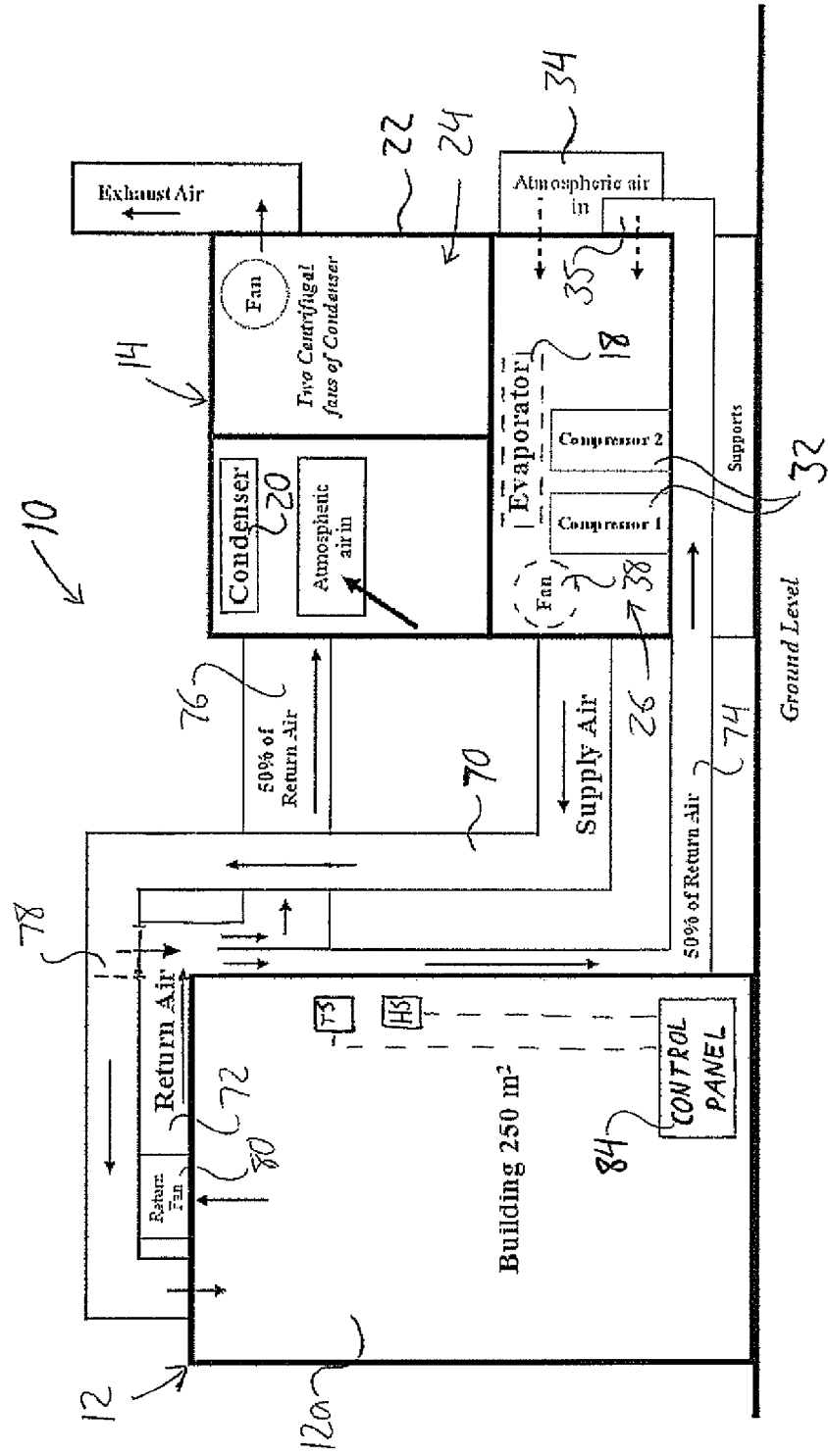
FIG. 1 is a schematic side elevational view (not to scale) of an air conditioning, ventilation and water extracting apparatus of the present invention installed for selective cooling, ventilation and water production for a building.

FIG. 1 schematically shows an air conditioning, ventilation and water production system 10 of the present invention installed on a property or site for the purpose of providing a cooling and ventilation function to the interior space of a building 12 on the property and producing water from hot or warm moisture laden atmospheric air outside the building for collection and use on or off site, for example to provide a source of potable water for occupants of the building. The system employs an air processing unit 14 which is disposed outside the building and contains the necessary equipment for cooling outdoor atmospheric air to be supplied to the building for air conditioning and exchange and for extracting water from such atmospheric air.

In the illustrated embodiment, the unit 14 employs a refrigerant-based cooling system for these purposes. The system is operable in a cooling mode, in which the cooled atmospheric air is conveyed into the interior space 12a of the building 12, but also operable in a water generating mode in which atmospheric air is still cooled for the purpose of extracting water therefrom, but is not distributed into the building. The same cooling element, the refrigerant evaporator 18 of the single refrigeration system, is used to cool atmospheric air and condense water therefrom regardless of which of the two modes (i.e. cooling vs. water generation) the system is being operated in at any given time. When operating in the cooling mode, return air from the building 12 is split into two streams, one of which mixes with fresh atmospheric air entering the unit for cooling to help bring down the temperature of this incoming atmospheric air to reach the dew point at which water vapor therein will condense, and the other of which mixes with atmospheric air in another part of the unit for the purpose of the cooling the refrigerant condenser 20 of the refrigeration system. Recirculating a portion of the cool return air thus increases water production, while the other portion reduces power consumption by providing more effective cooling of the condenser than would be possible using only the warm atmospheric air.

An embodiment of the schematically illustrated unit 14 of FIG. 1 is shown in greater detail in FIGS. 2 through 5. A housing 22 of the unit has its interior divided into three separated sections. A top compartment 24 of the housing defines a heat dissipation chamber in which the condenser coils 20, 20' are mounted, as shown in FIG. 4. A bottom compartment 26 underlying the floor of the top compartment 24 is divided into two separated sections, one being a cooling chamber 28 in which the refrigerant evaporator 18 is mounted and the other being a compressor compartment 30 containing one or more compressors 32 (of which there are two in the illustrated embodiment). The refrigeration system of the illustrated embodiment features a convention vapor compression refrigeration loop or circuit having a compressor connected between the outlet and inlet of the evaporator and condenser respectively, and an expansion valve between the outlet and inlet of the condenser and evaporator respectively. In this conventional refrigeration cycle, circulating refrigerant is compressed in the compressor, fed through the condenser where it is liquefied to dissipate heat into air passing through the heat dissipating chamber of the housing, then fed through an expansion valve and expanded before feeding through the evaporator to extract heat from air passing through the cooling chamber of the housing.

With reference to FIG. 5, the cooling chamber 26 has a fresh air inlet duct opening at one end that is shown as equipped with a sand trap louver 34 for separating sand or other large particulate from air entering the housing 22 at this inlet. At the same end, a return air inlet 35 opens into the cooling chamber 26 beside the louvered fresh air inlet 34 (see FIG. 4). At the opposite end of the cooling chamber 26 is an outlet duct opening fitted with a flexible connection 36 to an outlet shroud of a fan 38 mounted in the cooling chamber adjacent this outlet. Under operation of its motor 40, this fan 38 draws air through the cooling chamber 26 from the cooling chamber inlets 34, 35 to the cooling chamber outlet 36, and forces air onward through the system as described herein further below.

The fan 38 is preferably seated atop the bottom floor of the cooling chamber 26 by way of anti-vibration mounts 42. Between the fan 38 and the inlet end of the chamber is the refrigerant evaporator coil or tubing 18. The illustrated embodiment additionally features a moisture eliminator 44 between the evaporator 18 and the fan 38 to capture water carried past the evaporator by the moving air, and a reheating coil 46 between the eliminator 44 and the fan 38 to allow some degree of reheating of air that has been excessively cooled by the refrigerant evaporator to adjust (lower) the relative humidity of the air to a suitable level that will be comfortable to the indoor space being air conditioned. To clean the incoming air, the illustrated embodiment also features a pleated air filter 48 between the refrigerant evaporator and the inlet end of the chamber and a flat air filter 50 between the pleated filter and the chamber's inlet end.

Referring to FIGS. 2 and 3, the compressor chamber 30 extends alongside the cooling chamber 26 and the two compressors reside in a half of the compressor chamber 30 nearest the outlet end of the cooling chamber 26. The compressor chamber 30 communicates with the exterior environment outside the housing 22 at this end of the chamber 30 and along the outer side of the compressor chamber 30 opposite the cooling chamber 26. In the illustrated embodiment, sheets or panels of steel wire mesh or grating 52 are mounted at these boundaries of the compressor chamber to restrict access to the chamber while allowing this communication with the outside environment to enable atmospheric air to flow into and out of the compressor chamber to cool the compressors 32. Use of hermetically sealed compressors is preferred to protect the compressors and their motors from wear or damage by the elements.

Referring to FIG. 4, the heat dissipation chamber 24 located atop the cooling and compressor chambers 28, 30 spans the full width and length of the housing 22, and features two fresh air inlets 54, 54', one in each side of the housing 22 adjacent the end thereof in which the cooling chamber outlet 36 is formed. Each fresh air inlet 54, 54' thus opens into the heat dissipation chamber in a direction perpendicular to the direction in which the inlets and outlets of the cooling and compressor chambers open into the housing 22. A respective refrigerant condensing coil or tubing section 20, 20' lies across each fresh air inlet 54 inside the heat dissipation chamber 24. A return air inlet opening 56 of the heat dissipation chamber 24 is located in the same end of the housing 22 as the outlet 36 of the cooling chamber 28, and is positioned adjacent the housing side wall in which one of the fresh air inlets 54 is formed. Thus, air streams entering the heat dissipation chamber 24 through the return air inlet 56 and respective fresh air inlet 54' mix as they do so. The refrigerant condensing coil 20' spanning this fresh air inlet opening 54' in the respective side wall of the housing is not parallel to the plane of that wall opening, instead being angled obliquely relative thereto so that the condenser 20' spans across both the return air inlet 56 and the respective fresh air inlet 54' from the housing side wall to the respective housing end wall. This way, air from both of these two inlets is forced to pass through the condenser 20' as it flows through the heat dissipation chamber.

The heat dissipation chamber 24 additionally features two exhaust air outlets 58 located in the same end wall of the housing 22 as the fresh air inlet 34 and return air inlet 35 of the cooling chamber 28 beneath it. Within the heat dissipation chamber 24 are two exhaust or condenser fans 60, one at each exhaust air outlet 58. Each fan is powered by a respective motor 62, and features a flexible connection 64 communicating the fan's outlet shroud with the respective exhaust air outlet 58, just like the flexible connection of the evaporator fan 38 in the cooling chamber 28. These fans function to draw air through the heat dissipation chamber 24 from the fresh air and return air inlets 54, 54', 56 to the two exhaust air outlets 58. A liquid receiver 17 is also mounted within the heat dissipation chamber 24. The liquid receiver 17 collects the water that is condensing out of the air in the cooling chamber, which is then directed to a collection tank separate from the housing via appropriate piping.

Referring to FIG. 4, at an end of the compressor chamber distal to the compressors 32, a control panel or connection panel 66 is present for providing user control over operation of the system and/or providing connection points to external systems and devices, for example connecting to an electrical power source for running the electrical components (compressors, fans, etc.) of the unit and connecting the system to an operator control panel at a remote location (e.g. inside the building 12, as schematically shown in FIG. 1). Referring to FIG. 2, an access door 68 on the side wall of the housing 22 is provided for secure concealing of the panel and selective access thereto by authorized control or service personnel.

Turning back to FIG. 1, a supply air duct 70 connects the outlet 36 of the cooling chamber 28 to the interior space 12a of the building 12 that is to be cooled when the unit 14 is run in an air conditioning cooling mode, for example by feeding air through a duct system that opens into the interior environment via a number of registers distributed throughout the building. A return air duct 72 similarly communicates with the interior space 12a of the building at a number of locations therein, and runs to the exterior of the building for connection to the unit 14. The return air duct splits into two separate branches before connecting to the unit. A recirculation branch 74 connects to the return air inlet 35 of the cooling chamber 28, while an exhaust branch 76 connects to the return air inlet 56 of the heat dissipation chamber 24. A damper arrangement 78 is operational to selectively open and close a shortcut path between the supply air duct 70 and the return air duct 72. The damper arrangement 78 is arranged to close off the supply air duct 70 from the internal space 12a of the building 12 when the shortcut is opened, and arranged to close off the shortcut when the supply air duct is open to the building interior.

The operation of the overall system will now be described with reference to FIG. 1.

In operation of the system in a cooling and ventilation mode, the shortcut path between the supply air and return air ducts is closed (as shown by the solid line position of damper 78 in the drawing), meaning that the supply air duct is fluidly open to the interior space of the building. To cool the air in the building, the evaporator fan 38 is run in order to draw outdoor atmospheric air into the cooling chamber 28 through the fresh air inlet 34 thereof and past the refrigerant evaporator toward the cooling chamber outlet 36. The refrigeration cycle operates to cool this fresh outdoor as it moves past the evaporator, from the which the forced air continues out of the cooling chamber into the supply air duct 70 to the building interior 12a under the force of the evaporator fan 38, which thus can be considered to operate as a supply air fan.

In exchange for this now-cooled outdoor air being directed into the building 12, stale indoor air is drawn out of the building interior 12a by operation of a return air fan 80 feeding into the return air duct 72, and onward into the two separate branches thereof.

By way of the circulation branch 74, a portion of the return drawn from the building is directed to the return air inlet 35 of the cooling chamber, where this return air mixes with fresh atmospheric (outdoor) air being drawn into the cooling chamber by continued operation of the evaporator fan 38. This mixture of hot fresh air and previously cooled return air is lower in temperature than if the cooling chamber were fed by fresh air alone, and thus more water vapor is condensed in the cooling chamber than would be by cooling of purely fresh outdoor air. Accordingly, the system's function as a water generator extracting usable water from hot, moisture-laden atmospheric air is improved by re-circulating a portion of the return air from the building.

The other portion of the return air from the building flows through the exhaust branch 76 of the return air duct and into the heat dissipating chamber 24 via the return air inlet 56 thereof, where this return air mixes with fresh outdoor air being drawn into the same chamber through the fresh air inlets 54, 54' thereof by operation of the two exhaust fans 60. This mixture of air entering the heat dissipation chamber is forced to pass through the condenser sections 20, 20' as it is drawn toward the exhaust fans 60 for discharge from the chamber through the exhaust outlets 58 thereof and into the outside environment. As the return air entering the heat dissipation chamber is cooler than the fresh outdoor entering same, as a result of having previously been cooled by the refrigerant evaporator prior to its distribution into the building, the overall temperature of the air flowing past the condenser is lower in temperature than if the heat dissipation chamber were fed by fresh air alone. Accordingly, cooling of the refrigerant condenser is improved, thus lowering the pressure of the refrigerant condensation and thereby reducing power consumption by the compressors.

At times when it is desirable to produce water without cooling the interior space of the building, the system is operated in a water-only mode, in which the condition of the damper arrangement 78 is reversed in order to open the shortcut between the supply and return air ducts 70, 72 and close off the connection of the supply duct to the building interior, as shown by the broken line position of the damper 78 in FIG. 1 and the broken line air flow arrow pointing through the solid-line position of the damper 78.

The evaporator/supply fan 38, the exhaust fans 60 and the refrigeration system are activated just like in the cooling mode, but the supply air doesn't enter the building at all, and instead just circulates through the system, and so the return fan is not operated in the water only mode. That is, air entering the cooling chamber 28 is cooled by the evaporator, and fed onward through the supply duct, and then into the shortcut duct to flow back to the unit without entering any room space of the building interior. A portion of the cooled air circulates back to the cooling chamber 28 through the circulation branch 74 to mix with fresh outdoor air and undergo another cooling operation by the refrigerant evaporator, the other portion of the cooled air is delivered to the heat dissipation chamber by the exhaust air duct 76 to mix with fresh outdoor air and cool down the refrigerant condenser before being exhausted back to the outdoor atmosphere. As the cooled air does not reach any interior room space of the building, no cooling function is performed, but water condensed out of the air during passage thereof past the evaporator is collected just as it is during the cooling mode operation of the system.

A control system is operable to control various aspects of the air conditioning, ventilation and water production system 10, and includes a user control panel 84 preferably installed somewhere within the building space for access by authorized operation personnel, for example a building owner, landlord or maintenance person. The control panel includes input devices by way of which the operator can switch the system between on and off states, and in the on state switch the system between cooling and ventilation mode operation and water-production only operation. That is, input devices at the control panel are operable to control the damper arrangement 78 in the ductwork by way of a control system output signal to control whether the air cooled by the refrigerant evaporator of the unit 14 is circulated through the building (for cooling and ventilation of the indoor space) or short-cut into the return air branches 74, 76 (for water production without cooling and ventilation of the indoor space). Like other HVAC systems, the computerized control system also has a temperature selection control for allowing the operator to set a desired temperature for the indoor space, and temperature sensors TS in the indoor space monitor the actual temperature values, in response to which the system is run in the cooling mode as required to reach and maintain such temperature.

The control system also controls dampers that are operated to control the percentage of fresh outdoor air and circulated return air in the mixture of these air sources entering the cooling chamber 28 for distribution to the building's interior space during cooling mode operation. The nominal operation of the unit in the cooling mode is preferably 50% fresh air and 50% with a desired room temperature of 22-23° C. and 55% relative humidity. However this percentage may be decreased when the internal temperature is noticed to be increasing above the target room temperature (e.g. 22-23° C.). The monitoring system cooperating with the control system preferably includes not only temperature sensors, but humidity sensors HS as well, with the control system employing software or programming to read the conditions detected by the monitoring system. Also, arrangements are considered for manual measurements of temperature and humidity by certified thermometers and hygrometers, respectively. Manual measurements may be monitored by the occupants of the building frequently to make sure that the control system works efficiently. Moreover, the fresh air may be increased if the building occupants feel uncomfortable, which for example are recorded manually by the operator based on complaints or requests by occupants. It is to be noted that the reduction of the percentage of the fresh air below 50% reduces power consumption of the compressors as well as the rate of water condensation.

The opening and closing of dumpers can be adjusted automatically by the control system or manually by operator. The control system may employ a programmable logic controller (PLC) to receive inputs based on the measured indoor temperature, the measured indoor humidity, the desired indoor temperature set by the operator, the on/off status set by the operator, and the mode of operation set by the operator (cooling vs. water production). For example, in response to detection that the system is "on" and set to the water producing mode, the PLC sends an output to the dumper actuators that sets the dumper positions in a manner setting a 50% mixture (1:1 ratio) of fresh air and return air for the cooling chamber intake, and sends an output to the actuator of the damper arrangement 78 that short circuits the supply air duct to the return air duct to bypass the building's interior space, thus producing water at the cooling chamber without cooling the building interior. A change to cooling mode operation, for example in response to user input at the control panel, switches reverses the condition of the damper arrangement, closing off the short-circuit path and opening the connection of the supply air duct the building interior to effect cooling thereof.

In the preferred embodiment, the monitoring and control systems record the power consumption of the unit and the amount of condensed water for time periods of equal length at different intervals in time. For example, power consumption and water production over a five minute period of time every five minutes may be recorded, or a ten minute period every 10 minutes, etc. In other examples, the interval length need not match the period length, for example, recording data for a 5 minute period every ten minutes. In other examples, the time period or interval may be measured in hours instead of minutes. The system stores the data on a computer readable medium, and an output device is provided for conveying the data or information reflective thereof to the system operator for consideration. For example, a display screen or printer may be used to present data or information to the operator, for example in the form of data sheets, charts, tables or time graphs. Thus, the operator can use the output to determine which part of the day provides the best water condensation performance of the system. This is determination can be very important in deciding when to operate the system in the water-only mode in order to balance the desire for maximum water production with the desire to cool the building space. That is, the optimum period of day for water production can be estimated according to the operating and environmental conditions. The operator can thus choose when to switch to the water-only mode during the day for the best water condensation performance based on the recorded data. The recorded data may be used to make adjustments on a relatively short-period basis, weekly, or on a long-period basis, monthly or yearly.

Also, this monitoring procedure helps in deciding the best operation period to minimize power consumption if there is a good quantity of water already condensed and stored. So, the operator may decide not to operate the unit all the time but choose the best period of operation to minimize power consumption.

A preferred embodiment has been designed using R-22 refrigerant, with a cooling capacity of 25TR (88 kW) at 50% re-circulated air (50% fresh air), to cover 250 m$^2$ of space in a residential building context, for example in villas of coastal cities. The evaporator is fed with air flow rate of 1085 litres/second, and at average annual ambient dry bulb air temperature of 37° C. and 77% relative humidity with average supply air temperature of 16° C. to the building, can condense about 1.6 m$^3$/day of fresh water, using 2 hermetic reciprocating compressors with average power of 23 kW. Energy consumption is about 40 Wh/liter of condensed water, excluding the air-conditioning power consumption. Exclusive control panel is attached to the unit providing the possibility to vary the percentage of fresh air with adapted internal building conditions, which reflects on the water productivity up to 100% of the unit loading. The unit may be powered by a moderate wind turbine or a solar-cell station of 100-150 kW, for example when operating in remote areas. When intended for use purely for water extraction, the unit can be loaded onto a truck or other suitable vehicle for mobility and transport to an area in need of potable water, for example in response to a natural disaster or other emergency, the unit having suitable electrical connections for hook up to an appropriate power supply.

When used for water production, the exhaust air from the unit may be used for heating purposes. Thus, the unit may work as a heat pump for heating applications. A variable frequency compressor may be used to lower the overall energy consumption. The compressor adapts its loading according to the cooling load and the percentage of fresh air in the intake air. The preferred operation of the unit with 50% fresh air during cooling mode operation provides a healthy and comfortable environment within the building.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Air conditioning and water generating system comprising:
   a cooling chamber having a cooling chamber inlet and a cooling chamber outlet;
   a cooling element disposed within the cooling chamber between the cooling chamber inlet and cooling chamber outlet;
   a supply air passage connecting the cooling chamber outlet to an interior environment of a building;
   a forced air system operable to draw atmospheric air from an external environment outside the building through the cooling chamber inlet and past the cooling element;
   a water collection system configured to collect water that condenses from the atmospheric air during flow thereof past the cooling element under operation of the forced air system;
   a control system operable to control air flow through the supply air passage and thereby switch between an air conditioning mode, in which flow through the supply air passage is allowed to supply the interior environment with cooled air from the cooling chamber, and a water generating mode, in which the flow through the supply air passage to the interior environment is closed off, whereby water condensed from the atmospheric air by operation of the cooling element in the cooling chamber is collected by the water collection system in both the air conditioning and water generating modes;
   a return air passage connected between the interior environment of the building and the cooling chamber, the forced air system being operable in the air conditioning mode to direct a flow of return air from the interior environment past the cooling element with a flow of fresh atmospheric air entering the cooling chamber inlet from the exterior environment; and
   a shortcut path openable and closeable between the supply air passage and the return air passage, the control system being configured to open the shortcut path in the water generating mode in order to shortcut the supply air passage to the return air passage in order to recirculate at least some of the cooled air from the cooling chamber back to the cooling chamber for a subsequent pass therethrough without circulation of said cooled air through the interior environment of the building.

2. The air conditioning and water generating system of claim 1 comprising:
a heat dissipation chamber having a heat dissipation outlet communicating with the external environment;
a heat dissipating element disposed within the heat dissipation chamber and cooperating with the cooling element to discharge heat collected thereby from the atmospheric air in the cooling chamber; and
a return air path connected between the interior environment of the building and the heat dissipation chamber;
the forced air system being operable to direct a stream of return air from the interior environment through the return air path, past the heat dissipating element and onward through the heat dissipation outlet to the external environment.

3. The air conditioning and water generating system of claim 2 wherein the return air passage and the return air path branch apart from a common return air feed.

4. The air conditioning and water generating system of claim 3 wherein the return air passage and the return air path are arranged to receive equal airflows from the common return air feed.

5. The air conditioning and water generating system of claim 3 wherein the shortcut path is connected between the supply air passage and the common return air feed in order to shortcut the supply air passage to both the return air passage and the return air path in the water generating mode.

6. The air conditioning and water generating system of claim 2 wherein the heat dissipation chamber has at least one atmospheric air inlet communicating with the external environment, the forced air system being operable to convey the stream of return air past the heat dissipation element with a stream of fresh atmospheric air.

7. The air conditioning and water generating system of claim 2 wherein the cooling element comprises an evaporator of a refrigeration system and the heat dissipating element comprises a condenser of said refrigeration system.

8. The air conditioning and water generating system according to claim 1 wherein the control system is operable to change a ratio between fresh atmospheric air and return air in the flow of return air and fresh atmospheric air past the cooling element without switching between the air conditioning and water generating modes.

9. The air conditioning and water generating system according to claim 8 wherein the control system is operable to change the ratio on the basis of user input from an operator.

10. The air conditioning and water generating system according to claim 8 wherein the control system is configured to allow change of the ratio over a range of values, said range including a ratio value reflective of a respective mixture level somewhere between 40 and 60% fresh atmospheric air.

11. The air conditioning and water generating system according to claim 8 wherein the control system is configured to allow change of the ratio over a range of values, said range of values including a 1:1 ratio value reflective of a mixture of 50% fresh atmospheric air and 50% return air.

12. The air conditioning and water generating system according to claim 10 wherein the control system is configured to default to said ratio value in at least one of the air conditioning and water generating modes.

13. The air conditioning and water generating system according to claim 11 wherein the control system is configured to default to the 1:1 ratio value in at least one of the air conditioning and water generating modes.

14. The air conditioning and water generating system according to claim 12 wherein the control system is configured to default to said ratio value in the air conditioning mode.

15. The air conditioning and water generating system according to claim 12 wherein the control system is configured to default to said ratio value in the water generating mode.

16. The air conditioning and water generating system of claim 1 wherein the cooling element comprises an evaporator of a refrigeration system.

17. The air conditioning and water generating system according claim 1 comprising a monitoring system operable to measure water collection by the water collecting system and record data reflective of volumes of water collected during different respective time periods of equal length for use in determining optimal times for operating the system in the different modes.

18. The air conditioning and water generating system of claim 17 wherein the monitoring system is operable to also measure energy consumption and record data reflective of amounts of energy consumed during said different respective time periods of equal length for use in determining optimal times for operating the system in the different modes.

\* \* \* \* \*